United States Patent [19]

Nakayama

[11] Patent Number: 5,065,456
[45] Date of Patent: Nov. 12, 1991

[54] METHOD AND APPARATUS FOR ENHANCING THE ENABLE RESPONSE OF A LASER DIODE USED IN AN OPTICAL COMMUNICATION SYSTEM

[76] Inventor: Takao Nakayama, Interconnect Group, Research and Development Center Digital Equipment Corp. Japan 6 - 14 Sanban-cho, Chiyoda-ku, Tokyo 102, Japan

[21] Appl. No.: 373,084

[22] Filed: Jun. 28, 1989

[30] Foreign Application Priority Data

Feb. 6, 1989 [JP] Japan .................................. 1-027331

[51] Int. Cl.⁵ .......................................... H04B 10/04
[52] U.S. Cl. .................................................. 359/187
[58] Field of Search ............................. 455/609–611, 455/613, 618

[56] References Cited

U.S. PATENT DOCUMENTS

| | | | |
|---|---|---|---|
| 4,558,465 | 12/1985 | Siegel | 455/609 |
| 4,611,352 | 9/1986 | Fujito | 455/613 |
| 4,612,671 | 9/1986 | Giles | 455/613 |
| 4,709,416 | 11/1987 | Patterson | 455/618 |
| 4,718,118 | 1/1988 | Viola | 455/613 |

FOREIGN PATENT DOCUMENTS

| | | | |
|---|---|---|---|
| 0222630 | 12/1983 | Japan | 455/618 |
| 0182637 | 10/1984 | Japan | 455/613 |

*Primary Examiner*—Curtis Kuntz
*Assistant Examiner*—L. Pascal
*Attorney, Agent, or Firm*—Arnold, White & Durkee

[57] ABSTRACT

An apparatus 10 controls the enable response time of a laser diode 12 during the reception of a data signal. The laser diode 12 is powered by the combined outputs from a pulse and bias current supply 14, 16. The pulse current supply 14 is connected to an external controller (not shown), which provides serial pulses of data. The pulse current supply 14 converts the serial pulses of data to a series of current pulses that drive the laser diode 12 between high and low optical output intensity. The bias current supply 16 provides a DC offset to the pulse output of the pulse current supply 14. Further, the apparatus 10 controls the level of the DC offset to maintain the minimum optical output intensity of the laser diode 12 at a preselected desired level. The apparatus 10 constitutes a closed-loop, bias-current-supply controller 20, which employs a feedback path for monitoring the optical output intensity of the laser diode 12 and controlling the optical output intensity to a preselected value. To accomplish stable operation but permit rapid response to an enable signal, the closed-loop, bias-current-supply controller 20 has a first preselected response characteristic for a first preselected period of time in response to receiving the enable signal and a second preselected response characteristic thereafter.

41 Claims, 4 Drawing Sheets

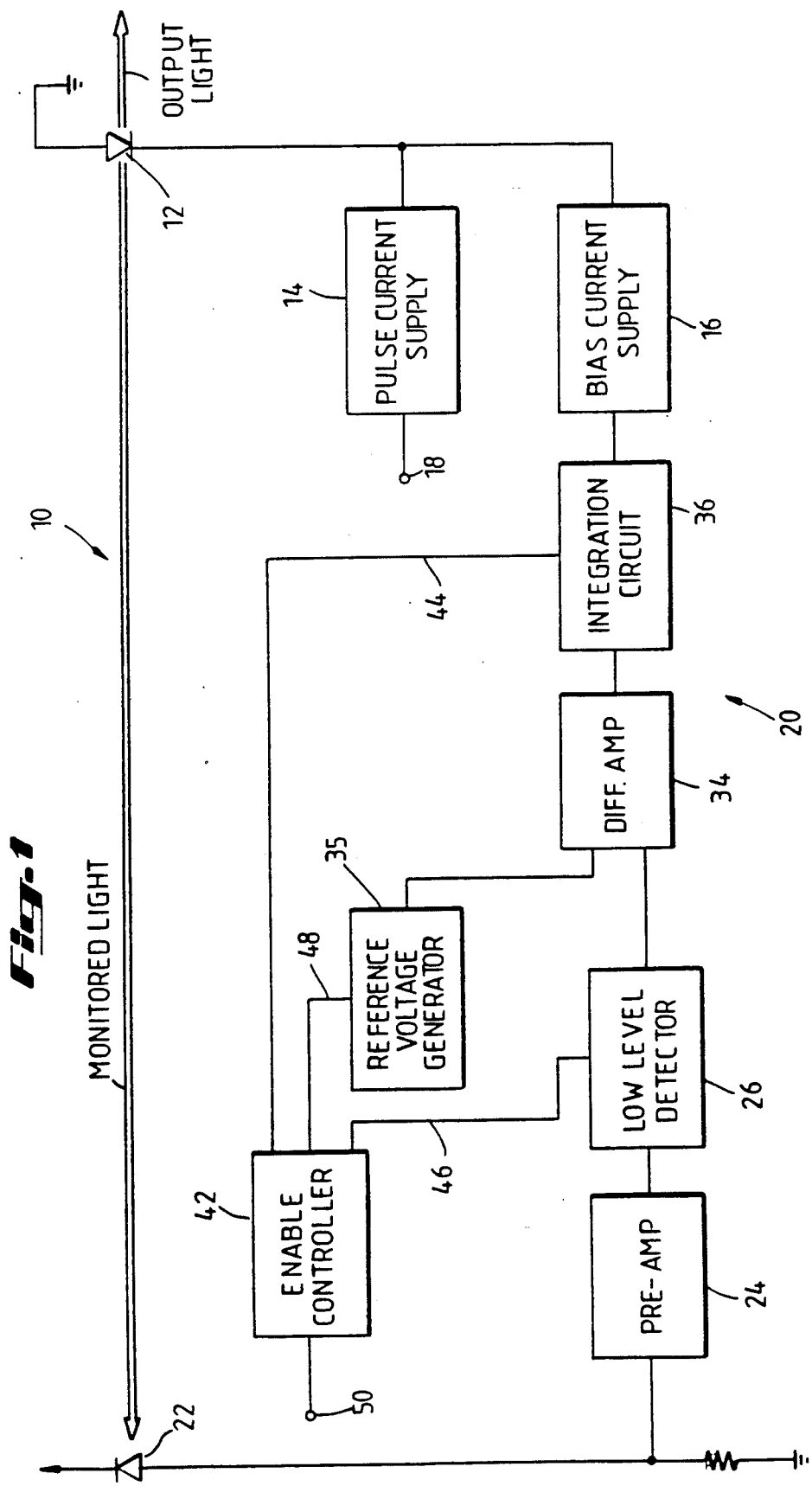

METHOD AND APPARATUS FOR ENHANCING THE ENABLE RESPONSE OF A LASER DIODE USED IN AN OPTICAL COMMUNICATION SYSTEM

FIELD OF THE INVENTION

This invention relates generally to a method and apparatus for enhancing the enable response time of a laser diode used in an optical transmitter of an optical communication system or an optical interconnect and, more particularly, to a method and apparatus for controlling the response time of a closed loop automatic power control during the initial portion of the enable time period of a laser diode.

DESCRIPTION OF THE RELATED ART

Laser diodes are commonly used in optical communication systems for high-speed data transmission. To sustain high-speed communication in optical local area networks or optical interconnections in computer systems, a good response to data burst signals is sometimes required of the optical transmitter. One such circuit for accomplishing good response to data burst signals is illustrated in my co-pending application No. 373,158 filed June 28, 1989, issued July 31, 1990 as U.S. Pat. No. 4,945,541, entitled "A Method and Apparatus for Controlling the Bias Current of a Laser Diode."

However, while it is ordinarily true that a laser diode is operated between relatively high and low optical output intensity, it is never completely shut "off." That is, the bias current of the laser diode is never turned "off." Thus, the laser diode is typically in a low optical output state, which corresponds to the supplied bias current, when a data burst arrives. Therefore, there is no initial enablization delay. That is to say, the laser diode is initially at a low optical output intensity, rather than at zero optical output intensity.

On the other hand, in some applications, for example, in passively star-coupled interconnections, in which many optical transmitters and receivers carry out multiple-access, complete shut down of the transmitter's optical output is required. In the case of passively star-coupled interconnections, the residual light of multiple transmitters accumulates and significantly deteriorates the extinction ratio of the receiver incident light. This accumulated low level light results in a poor signal to noise ratio. While none of the individual transmitters produce sufficient light to affect the receiver, the collective low level light from all of the transmitters is significant enough to raise the aggregate low level.

Therefore, the laser diode should be completely shut down when it is not transmitting data. The signal that controls this shut down is called the enable signal and is delivered before the actual data signal is delivered. It should be appreciated that to obtain high communication efficiency, quick response to the enable signal is required to reduce the communication overhead. For example, if the enable response of the laser diode is slow, the initial portion of the data in a data stream may not be accurately converted to an optical signal and, therefore, a large overhead time corresponding to the enable response time is required.

Further, stable operation of a closed loop automatic power control system illustrated in the above-mentioned co-pending application is achieved by establishing the response characteristics of the closed loop to prevent undesirable unstable operation. This stable operation is achieved by slowing the response speed; however, this slowed response speed also operates to increase response time to the enable signal, thereby resulting in the long enable response times discussed above.

The apparatus of the invention overcomes or minimizes the above-identified problems by providing a closed loop control circuit for a laser diode that enhances laser diode response to an enable signal by reducing the response time of the control circuit during the initial portion of the enable time period.

SUMMARY OF THE INVENTION

In one aspect of the present invention, an apparatus is provided for controlling the enable response time of an optical transmitter during the reception of a data signal. The optical transmitter receives current from a pulse and a bias current supply. First means delivers an enable signal having a time duration correlative to the data signal. A closed-loop, bias-current-supply controller has a feedback path for monitoring the optical output intensity of the optical transmitter and delivering and controlling the optical output intensity to a preselected value. The closed-loop, bias-current-supply controller has a first preselected response time for a first preselected period of time in response to receiving the enable signal and a second preselected response time thereafter.

In another aspect of the present invention, a method is provided for controlling the enable response time of an optical transmitter during the reception of a data signal. The optical transmitter receives current from a pulse and a bias current supply. The method includes the steps of: delivering an enable signal having a time duration correlative to the data signal; delivering a first signal having a magnitude proportional to the optical intensity of the optical transmitter output; and storing the magnitude of the first signal. The magnitude of the stored first signal varies at a first preselected rate for a first preselected duration of time in response to receiving the enable signal and at a second preselected rate thereafter. The method further includes the steps of: comparing the magnitude of the stored signal to a preselected magnitude and altering the magnitude of the bias current in response to the first signal differing from the preselected magnitude.

BRIEF DESCRIPTION OF THE DRAWING

Other advantages of the invention will become apparent upon reading the following detailed description and upon reference to the drawing in which:

FIG. 1 is a block diagram of the instant apparatus;

Figure 2A:
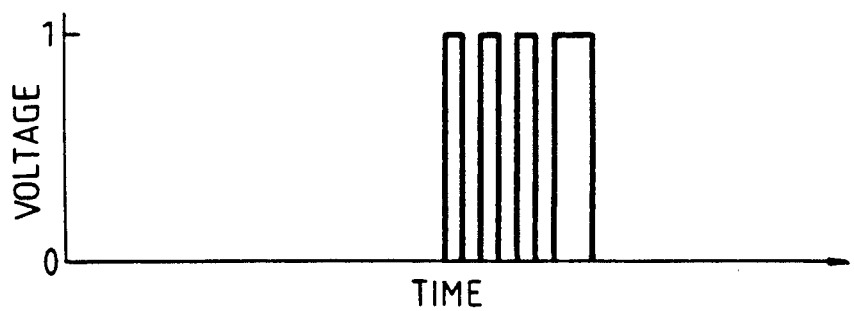
FIGS. 2A-E are graphical representation of enable and data signals of the instant apparatus.

While the invention is susceptible to various modifications and alternative forms, specific embodiments thereof have been shown by way of example in the drawing and are herein described in detail. It should be understood, however, that there is no intention to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Turning to the drawings and referring to FIG. 1, one embodiment of an apparatus 10 that controls the enable response time of an optical transmitter, such as a laser diode 12, during the reception of a data signal is illustrated. The laser diode 12 is powered by the combined outputs from a pulse and bias current supply 14, 16. T pulse current supply 14 has a data input terminal 18 connected to an external controller (not shown), which provides serial pulses of data. The pulse current supply 14 converts the serial pulses of data to a corresponding series of current pulses that drive the laser diode 12 between corresponding "high" and "low" optical output intensity.

The bias current supply 16 provides a DC offset to the pulse output of the pulse current supply. Further, the apparatus 10 controls the level of the DC offset to maintain the minimum optical output intensity of the laser diode 12 at a preselected desired level.

The apparatus 10 constitutes a closed-loop, bias-current-supply controller 20. The closed-loop, bias-current-supply controller 20 employs a feedback path for monitoring the optical output intensity of the laser diode 12 and controlling the optical output intensity to a preselected level. In order to accomplish stable operation but permit rapid response to an enable signal, the closed-loop, bias-current-supply controller 20 has a first preselected response characteristic for a first preselected period of time in response to receiving the enable signal and a second preselected response characteristic thereafter.

The closed loop feedback path includes a photodiode 22 that receives a portion of the light delivered by the laser diode 12. The photodiode 22 delivers an output that has a magnitude proportional to the intensity of the light delivered by the laser diode 12. A preamplifier 24 receives and amplifies the output from the photodiode 22.

The output of the preamplifier 24 is delivered to an optical low level detector 26. The optical low level detector 26 operates to store the minimum magnitude of the signal delivered by the preamplifier 24. In other words, the optical low level detector 26 detects and stores the trough level of the photodiode output, which corresponds to the minimum optical output intensity of the laser diode 12.

Figure 5:
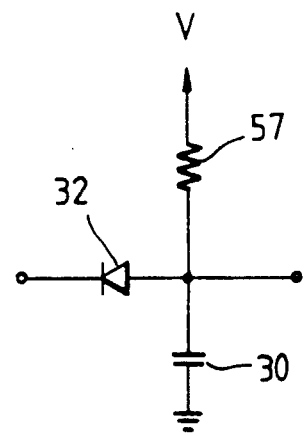
FIG. 5. is an electrical schematic of a low level detector.

The optical low level detector 26 includes, as exemplary shown in FIG. 5, a resistor 28 connected to a positive source of voltage V and to ground through a storage capacitor 30. A diode 32 has its cathode connected to the preamplifier 24 and its anode connected to the junction of the resistor 28 and capacitor 30. This embodiment of the optical low level detector 26, however, does not include provision for altering the rate of increase of the stored level when the input signal level is higher than the stored signal level (droop rate) of the optical low level detector 26, but its operation is useful in understanding the overall operation of the apparatus 10. An embodiment of a optical low level detector 26 that includes means for altering its droop rate is discussed in greater detail herein in conjunction with FIG. 3.

The arrangement of the optical low level detector 26 shown in FIG. 5 operates so that when the voltage level of the preamplifier output signal falls to a value less than the voltage stored by the capacitor 30, the diode 32 is biased "on" and conducts current to the preamplifier 24, thereby providing a discharge path for the capacitor 30. The capacitor 30 discharges to a value corresponding to the lowest voltage level of the preamplifier output signal. Therefore, it can be seen that the voltage level stored at the capacitor 30 corresponds to the trough voltage level of the photodiode output signal, which corresponds to the minimum optical output intensity of the laser diode 12.

The signal stored in the capacitor 30 is delivered to one input of a differential amplifier 34. The second input to the differential amplifier 34 is connected to a reference voltage generator 35 where the reference voltage represents the preselected desired trough level of the laser diode output signal. The two inputs to the differential amplifier 34 are connected so that an increase in the low level of the optical output intensity of the laser diode 12 causes a decrease in the bias current provided to the laser diode 12.

Figure 6:
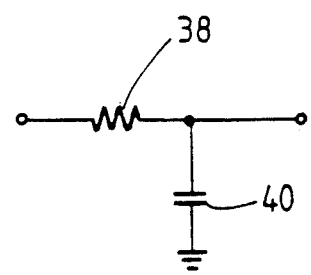
FIG. 6 is an electrical schematic of an integration circuit.

An integration circuit 36 is connected to the output of the differential amplifier 34 and includes, as exemplary shown in FIG. 6, a resistor 38 and capacitor 40 connected to system ground. This embodiment of the integration circuit 36, however, does not include provision for altering the time constant of the integration circuit 36, but its operation is useful in understanding the overall operation of the apparatus 10. An embodiment of a integration circuit 36 that includes means for altering its time constant is discussed in greater detail herein in conjunction with FIG. 4.

The integration circuit 36 operations to enhance stable operation of the overall circuit. When the optical output intensity of the laser diode 12 is "high," the stored voltage of the optical low level detector 26 increases because the output voltage of the preamplifier 24 is greater than the stored voltage of the optical low level detector 26. Therefore, the bias current provided to the laser diode 12 undesirably decreases and the optical output intensity of the laser diode 12 decreases, as shown in FIG. 8b. The integration circuit 36 operates to reduce this undesirable decrease of the bias current. The output of the integration circuit connected to drive the bias current supply 16, thereby completing the closed-loop controller 20.

The response speed of this closed loop is determined by the integration time constant of the integration circuit 36 (C*R), a maximum (saturated) output of the differential amplifier 34 and the gain (Gy) of the loop as shown by the equation (3) later herein. Therefore, the closed loop response characteristics is controlled by changing the time constant of the integration circuit and the droop rate of the low level detector.

The time constant of the integration circuit 36 and the droop rate of the optical low level detector 26 are controlled by an enable controller 42 through control lines 44 and 46, respectively. The enable signal delivered to an enable signal input terminal 50 of the enable controller 42 is provided by an external controller (not shown), such as the same controller that initiates data signals to the pulse current supply 14.

In this implementation, the enable/disable function is realized by controlling the reference voltage output of the reference voltage generator 35. The reference voltage output is controlled by the enable controller 42 through a control line 48. For example, the enable signal to the reference voltage generator 35 operates to decrease the reference voltage to a relatively low magnitude, such as zero. Thus, the differential amplifier 34 ultimately decreases the bias current provided by the bias current supply 16 to zero to match the reference voltage. This, of course, effectively shuts down the laser diode 12.

A better appreciation of the operation of the apparatus 10 is had by reference to the timing diagrams illustrated in FIGS. 2A–E. FIG. 2A shows the initial portion of the input data signal delivered to the input terminal as a series of pulses that correspond to the serial data configuration 10101011.

Figure 2B:
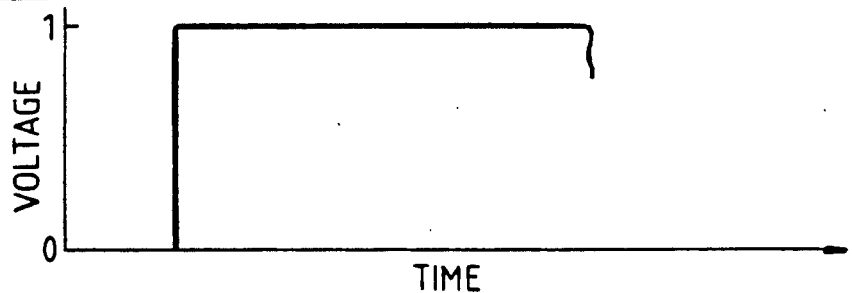
Figure 2C:
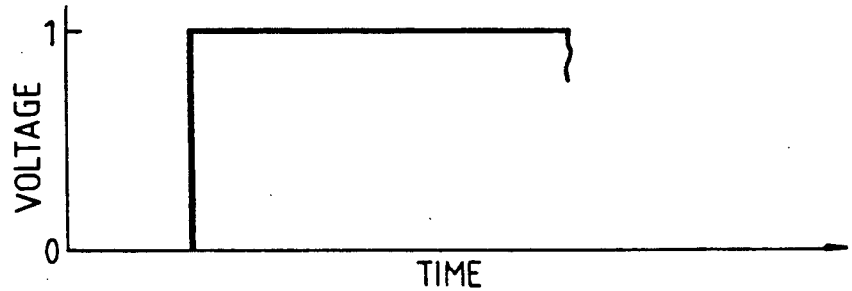

FIG. 2B shows the enable signal provided at the signal input terminal 50 and delivered to the enable controller 42. The enable signal is asserted for a period of time correlative to the duration of the serial data signal of FIG. 2A. FIG. 2C shows the control signal on the control line 48 delivered to the reference voltage generator 35. This control signal is of similar duration as the enable signal to ensure that the desired reference voltage is applied to the differential amplifier 34 throughout the enable time period. In this manner, the reference voltage generator is permitted to generate the reference voltage of a preselected magnitude, corresponding to the desired trough level, to one input of the differential amplifier 34.

Figure 2D:
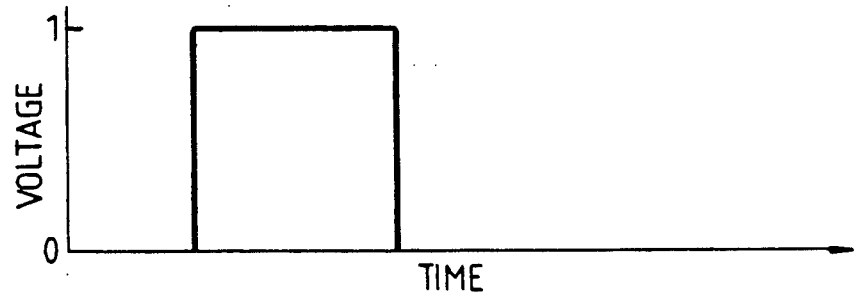
Figure 2E:
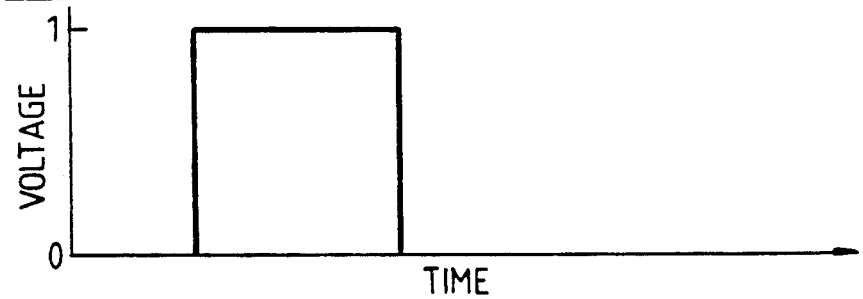

Similarly, FIGS. 2D and 2E show the control signals on the lines 46 and 44 respectively delivered to the optical low level detector 26 and the integration circuit 36. Unlike the control signal delivered to the reference voltage generator 35, the control signals of FIGS. 2D and 2E are of a first and second preselected duration of time, substantially less than the enable time period. Preferably, the above mentioned integration circuit control signal should not be negated while the above-mentioned low level detector control signal is asserted. These limited duration control signals operate to reduce the response time of the overall control loop during the initial portion of the enable time period.

In particular, the low level detector control signal increases the rate at which the optical low level detector 26 permits its stored signal to increase. For example, in the presence of the low level detector control signal, the magnitude of the signal stored by the optical low level detector 26 increases at a first preselected rate, which is substantially greater than the rate at which the stored signal increases in the absence of the low level detector control signal.

Figure 3:
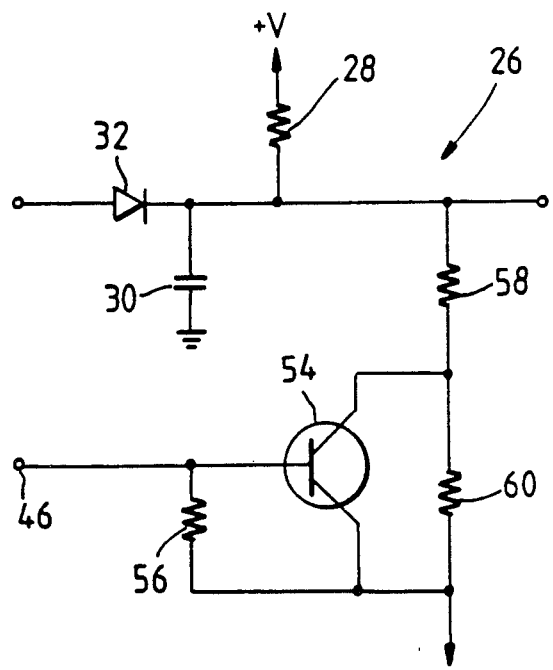
FIG. 3 is a detailed electrical schematic of the low level detector.

Referring to FIG. 3, an electrical schematic of one embodiment of the optical low level detector 26, which includes means for varying the droop rate of the optical low level detector 26, is shown. It should be appreciated that the capacitor 30 and diode 32 are retained from the embodiment illustrated in FIG. 5 with little change. Further, resistor 28 of FIG. 5 corresponds to a pair of resistors 58, 60. The diode 32, however, is illustrated connected in opposite polarity to that shown in FIG. 5.

Thus, the optical low level detector 26 is actually configured as a peak level detector. The intention here is to illustrate that if the preamplifier 24 is an inverting amplifier, then the optical low level detector 26 is configured to detect a peak rather than a trough. When an inverting amplifier is employed, the peak of the output signal corresponds to the minimum optical output intensity rather than the trough of the output signal.

To vary the droop rate of the optical low level detector 26, an NPN bipolar junction transistor 54 has its base connected to the control line 46 and to a voltage supply $-V$ through a resistor 56. The pair of resistors 58, 60 are serially connected between the voltage supply $-V$ and the junction of the resistor 28 the capacitor 30. Additionally, the collector and emitter of the transistor 54 are connected across the resistor 60 to effectively bypass the resistor 60 when the transistor 54 is biased "on."

Thus, during the period of time when the control signal on line 46 is "asserted," the transistor 54 is biased "on," thereby reducing the total resistance of the optical low level detector 2 and increasing the droop rate. Subsequently, after the preselected duration of time when the control signal falls to its "negated" value, the transistor 54 is biased "off" and the resistor 60 again forms a portion of the circuit, thereby increasing the overall resistance and reducing the droop rate.

It should be appreciated that the magnitude of the detected low level also changes slightly when the transistor 54 is biased "on" or "off". This slight change is compensated by simultaneously altering the reference voltage produced by the reference voltage generator 35.

Figure 4:
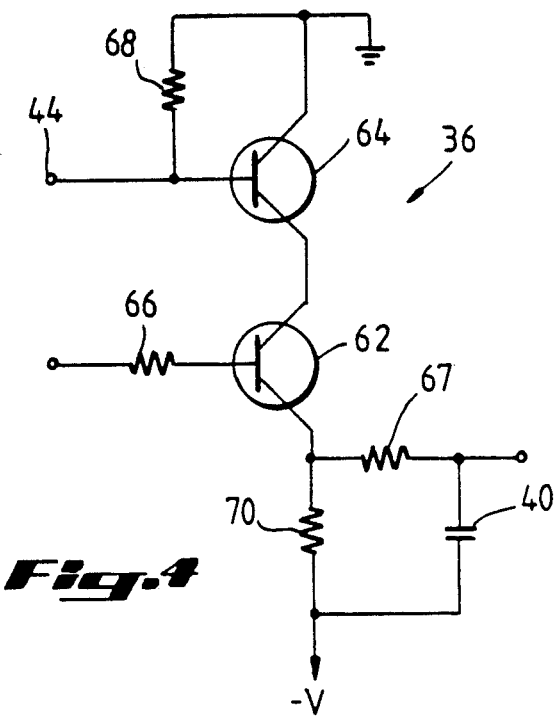
FIG. 4 is an electrical schematic of the integration circuit.

Referring to FIG. 4, an electrical schematic of one embodiment of the integration circuit 36, which includes means for varying the time constant of the integration circuit 36, is shown. It should be appreciated that the capacitor 40 is retained from the embodiment illustrated in FIG. 6 with little change.

To vary the response time of the integration circuit 36, an NPN and PNP bipolar junction transistor 62, 64 respectively are added to the embodiment illustrated in FIG. 6. Further, a resistor 66 is connected intermediate the base of the NPN transistor 62 and the output of the differential amplifier 34. The resistor 66 is selectively switchable into the integration circuit 36 to alter the total resistance of the integration circuit 36 and thereby change the time constant.

The PNP transistor 64 has its base connected to the control line 44 of the enable controller 42 and to ground and its own emitter through a resistor 68. The collector of the PNP transistor 64 is connected to the collector of the NPN transistor 62. The emitter of the NPN transistor 62 is connected to the resistor 38, as well as to a source of negative voltage $-V$ through a resistor 70.

When the PNP transistor 64 is biased "off" by a "negated" signal on the control line 44, the NPN transistor 62 operates as a base-emitter diode, thereby connecting the resistor 66 into the integration circuit 36. On the other hand, when the PNP transistor 64 is biased "on" by an "asserted" signal on the control line 44, the NPN transistor 62 operates as an emitter follower. Therefore, the resistor 66 can be neglected and, consequently, the integration time constant significantly decreases. It should be noted that the gain of the integration circuit correspondingly increases with the decreasing time constant.

Figure 7:
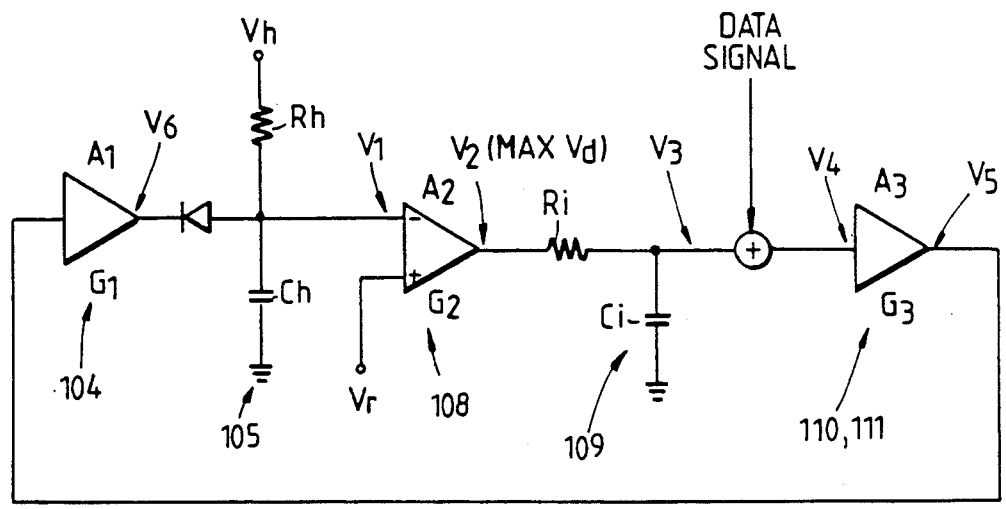
FIG. 7 is functional schematic of the instant apparatus.
Figure 8A:
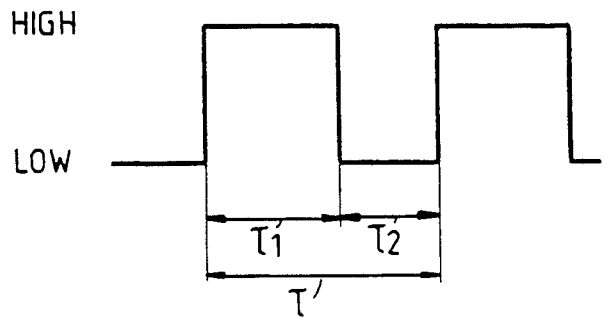
FIGS. 8A and B are graphical representations of the data signal and the corresponding electrical signal, respectively.
Figure 8B:
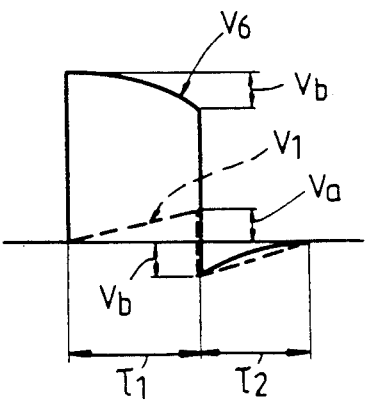

A better appreciation of the requirements of the optical low level detector 26 and integration circuit 36 are had by reference to the functional circuit diagram shown in FIG. 7 and the timing diagrams of FIGS. 8A and B. FIG. 7 is a simplified diagram of the closed loop bias current control circuit of the trough level control type. A1 corresponds to the preamplifier 24. A1 is preferably a linear element. Therefore, $$0 < G1 \text{ and}$$

$$V6 = G1 * V5$$

are assumed.

A2 corresponds to the differential amplifier 34. A2 is assumed to be a linear but saturating element. Therefore, $$0 < G2, \text{ and}$$
$$V2 = G2 * (Vr - V1), \text{ if}$$
$$V1 > Vr - Vd/G2 \text{ or}$$
$$V2 = Vd, \text{ if } V1 \leq Vr - Vd/G2.$$

A3 and the current junction 72 preceding it correspond to the bias current supply 16, the pulse current supply 14, the laser diode 12, the photodiode 22, and their coupling efficiency. Therefore, A3 is actually a strongly nonlinear element. However, A3 is assumed to be a linear element here for purposes of simplifying this description. Therefore, $$0 < G3 \text{ and}$$

$$V5 = G3 * V4$$

are assumed.

First, the stability of the circuit when data signal exists should be considered. FIG. 8A shows a representative waveform of the data input. The data signal is preferably a repeating signal that has a period of tau=-tau1+tau2.

FIG. 8B shows the allowed (regarded as stable) response of the circuit. The solid line represents the voltage waveform V6, which is analogous to the optical output intensity. The broken line represents the voltage waveform V1, which is the detected low (through) level. The increase rate of V1 when V6>V1 (droop rate of the low level of detector) is $$rd = \frac{Vh}{Ch * Rh}. \tag{1}$$

Therefore, $$Va = rd * tau1 = \frac{Vh * tau1}{Ch * Rh}.$$

Vb is roughly the integration of Gx*rd*time over time.

$$Vb = \frac{Gx * Vh * tau1^2}{2 * Ch * Rh * Ci * Ri}.$$

Where $Gx = G1 * G2 * G3$. If $$\frac{Vb}{Va} \leq \frac{tau2}{tau1},$$

then the circuit shows the response as shown in the FIG. 8B, and the operation is regarded to be stable. Therefore, $$Gx * tau1 * \frac{tau1}{tau2} \leq 2 * Ci * Ri \tag{2}$$

is the requirement for the stable operation. If tau1=tau2=tau0, equation (2) reduces to $$Gx * tau0 < 2 * Ci * Ri \tag{2'}.$$

Second, consider the case in which a data signal is not present and the transmitter is under transition from the disable state to the enable state. When the enable signal is asserted and the bias current starts to be provided by the laser diode, the amplifier A2 is considered to be initially saturated. The increase rate of V6 when A2 has saturated, that is, V2 =Vd, is $$ra = \frac{Vd * Gy}{Ci * Ri}. \tag{3}$$

Where Gy=G3*G1. To obtain the controlled response against the enable signal, ra should not be larger than rd (droop rate).

$$rd \geq ra \tag{4}.$$

Therefore, $$\frac{Vd}{Vh} * Gy * Ch * Rh < Ci * Ri \tag{5}$$

is the requirement to obtain the controlled response against the enable signal.

The last case to consider is the instance of the burst signal input. From the similar calculation, $$Gx * tau0 < (1 + sqr(3)) * Ci * Ri \tag{6}$$

is deduced to be the requirement to obtain the stable response against the burst data signal. Inequality (6) is automatically satisfied if inequality (2') is satisfied. However, if the system has some overshoot characteristics, inequality (6) should be modified as $$\frac{Gx^2 * tau0^2}{Ci^2 * Ri^2} + \frac{2 * Gx * Ch * Rh * Vs}{Ci * Ri * Vh} - \frac{2 * Gx * tau0}{Ci * Ri} \leq 2 \tag{7}$$

where Vs is the overshoot voltage at the output of A1.

I claim:

1. An apparatus for controlling the enable response time of an optical transmitter used in a digital optical communication system during the reception of a data signal, wherein said optical transmitter receives current from a pulse current supply representative of the data signal and a bias current supply, comprising:

first means for delivering an enable signal having a time duration correlative to said data signal;

a closed-loop, bias-current-supply controller having a feedback path for monitoring the optical output intensity of said optical transmitter and controlling the optical output intensity to a preselected value by controlling said bias current supply, said closed-loop, bias-current-supply controller being adapted for receiving said enable signal and allowing said bias current supply to vary at a first preselected rate for a first preselected portion of said enable signal and at a second preselected rate during a second portion of said enable signal.

2. An apparatus, as set forth in claim 1, wherein said closed-loop, bias-current-supply controller includes:
   second means for receiving a portion of the optical output of said optical transmitter and delivering a first signal having a magnitude proportional to the optical intensity of said optical transmitter optical output;
   third means for receiving said first signal and said enable signal and storing the magnitude of said first signal, wherein the magnitude of said stored first signal varies at a first preselected rate for a first preselected duration of time in response to receiving said enable signal and at a second preselected rate thereafter; and
   fourth means for comparing the magnitude of said stored signal to a preselected magnitude and altering the magnitude of said bias current in response to said first signal differing from said preselected magnitude.

3. An apparatus, as set forth in claim 1, wherein said closed-loop, bias-current-supply controller includes:
   second means for receiving a portion of the optical output of said optical transmitter and delivering a first signal having a magnitude proportional to the optical intensity of said optical transmitter optical output;
   third means for receiving said first signal and said enable signal and storing the magnitude of said first signal;
   fourth means for comparing the magnitude of said stored signal to a preselected magnitude and delivering a signal having a magnitude corresponding to the difference therebetween; and
   fifth means for integrating said difference signal and altering the magnitude of said bias current in response to the magnitude of said integrated difference signal, the time constant of said integrating means a first preselected value for a first preselected duration of time in response to receiving said enable signal and a second preselected value thereafter.

4. An apparatus for controlling the enable response time of an optical transmitter during the reception of a data signal, wherein said optical transmitter receives current from a pulse and a bias current supply, comprising:
   first means for delivering an enable signal, having a time duration correlative to said data signal;
   second means for receiving a portion of the optical output of said optical transmitter and delivering a first signal having a magnitude proportional to the optical intensity of said optical transmitter optical output;
   third means for receiving said first signal and said enable signal and storing the magnitude of said first signal, wherein the magnitude of said stored first signal varies at a first preselected rate for a first preselected duration of time in response to receiving said enable signal and at a second preselected rate thereafter; and
   fourth means for comparing the magnitude of said stored signal to a preselected magnitude and altering the magnitude of said bias current in response to said first signal differing from said preselected magnitude.

5. An apparatus, as set forth in claim 4, wherein said second preselected rate is greater than said first preselected rate.

6. An apparatus, as set forth in claim 4, wherein said second means includes a photodiode.

7. An apparatus, as set forth in claim 4, wherein said third means includes means for detecting the magnitude of said first signal corresponding to the minimum optical output of said optical transmitter and storing the magnitude corresponding to the minimum optical output of said optical transmitter.

8. An apparatus, as set forth in claim 7, wherein said minimum magnitude detecting means includes a resistor and capacitor serially connected to a source of an electrical power, a diode adapted to receive said first signal and being connected to the junction of said capacitor and resistor, and means for altering one of the capacitance of said capacitor and the resistance of said resistor in response to receiving said enable signal.

9. An apparatus, as set forth in claim 8, wherein said altering means includes a second resistor and means for connecting said second resistor in series with said resistor and capacitor.

10. An apparatus, as set forth in claim 9, wherein said means for connecting said second resistor in series with said resistor and capacitor includes a transistor connected in parallel with said second resistor and adapted for being biased on in response to receiving said enable signal, whereby said transistor substantially bypasses said second resistor.

11. An apparatus, as set forth in claim 8, wherein said diode is reverse biased.

12. An apparatus, as set forth in claim 8, wherein said diode is forward biased.

13. An apparatus, as set forth in claim 4, wherein said fourth means includes means for setting said preselected magnitude to zero in the absence of said enable signal.

14. An apparatus for controlling the enable response time of an optical transmitter during the reception of data signal, wherein said optical transmitter receives current from a pulse and a bias current supply, comprising:
   first means for delivering an enable signal, having a time duration correlative to said data signal;
   second means for receiving a portion of the optical output of said optical transmitter and delivering a first signal having a magnitude proportional to the optical intensity of said optical transmitter optical output;
   third means for receiving said first signal and said enable signal and storing the magnitude of said first signal;
   fourth means for comparing the magnitude of said stored signal to a preselected magnitude and delivering a signal having a magnitude corresponding to the difference therebetween; and
   fifth means for integrating said difference signal and altering the magnitude of said bias current in response to the magnitude of said integrated difference signal, the time constant of said integrating means being a first preselected value for a first preselected duration of time in response to receiving said enable signal and a second preselected value thereafter.

15. An apparatus, as set forth in claim 14, wherein said second preselected value is less than said first preselected value.

16. An apparatus, as set forth in claim 14, wherein said second means includes a photodiode.

17. An apparatus, as set forth in claim 14, wherein said third means includes means for detecting the magnitude of said first signal corresponding to the minimum optical output of said optical transmitter and storing the magnitude corresponding to the minimum optical output of said optical transmitter.

18. An apparatus, as set forth in claim 17, wherein said minimum magnitude detecting means includes a resistor and capacitor serially connected to a source of an electrical power, and a diode adapted to receive said first signal and being connected to the junction of said capacitor and resistor.

19. An apparatus, as set forth in claim 18, wherein said diode is reverse biased.

20. An apparatus, as set forth in claim 18, wherein said diode is forward biased.

21. An apparatus, as set forth in claim 14, wherein said fifth means includes a first resistor and capacitor, wherein the resistor is adapted to receive said difference signal and is connected to electrical ground through a capacitor, and means for altering one of the capacitance of said capacitor and the resistance of said resistor in response to receiving said enable signal.

22. An apparatus, as set forth in claim 21, wherein said altering means includes a second resistor and means for connecting said second resistor in series with said first resistor.

23. An apparatus, as set forth in claim 22, wherein said means for connecting said second resistor in series with said first resistor includes a transistor configured to operate as an emitter follower and a base-emitter diode in response to said enable signal being asserted and negated respectively, whereby the transistor substantially bypasses said second resistor.

24. An apparatus, as set forth in claim 14, wherein said fourth means includes means for setting said preselected magnitude to zero in the absence of said enable signal.

25. An apparatus for controlling the enable response time of an optical transmitter during the reception of a data signal, wherein said optical transmitter receives current from a pulse and a bias current supply, comprising:

first means for delivering an enable signal, having a time duration correlative to said data signal;

second means for receiving a portion of the optical output of said optical transmitter and delivering a first signal having a magnitude proportional to the optical intensity of said optical transmitter optical output;

third means for receiving said first signal and said enable signal and storing the magnitude of said first signal, wherein the magnitude of said stored first signal varies at first preselected rate for a first preselected duration of time in response to receiving said enable signal and at a second preselected rate thereafter;

fourth means for comparing the magnitude of said stored signal to a preselected magnitude and delivering a signal having a magnitude corresponding to the difference therebetween; and fifth means for integrating said difference signal and altering the magnitude of said bias current in response to the magnitude of said integrated difference signal, the time constant of said integrating means being a first preselected value for a first preselected duration of time in response to receiving said enable signal and a second preselected value thereafter.

26. An apparatus, as set forth in claim 25, wherein said second preselected rate is greater than said first preselected rate.

27. An apparatus, as set forth in claim 25, wherein said second preselected value is less than said second preselected value.

28. An apparatus, as set forth in claim 25, wherein said second means includes a -photodiode.

29. An apparatus, as set forth in claim 25, wherein said third means includes means for detecting the magnitude of said first signal corresponding to the minimum optical output of said optical transmitter and storing the magnitude corresponding to the minimum optical output of said optical transmitter.

30. An apparatus, as set forth in claim 29, wherein said minimum magnitude detecting means includes a first resistor and first capacitor serially connected to a source of an electrical power, a diode adapted to receive said first signal and being connected to the junction of said first capacitor and first resistor, and means for altering one of the capacitance of said first capacitor and the resistance of said first resistor in response to receiving said enable signal.

31. An apparatus, as set forth in claim 30, wherein said altering means includes a second resistor and means for connecting said second resistor in series with said first resistor and first capacitor.

32. An apparatus, as set forth in claim 31, wherein said means for connecting said second resistor in series with said first resistor and first capacitor includes a first transistor connected in parallel with said second resistor and adapted for being biased on in response to receiving said enable signal, whereby said first transistor substantially bypasses said second resistor.

33. An apparatus, as set forth in claim 30, wherein said diode is reverse biased.

34. An apparatus, as set forth in claim 30, wherein said diode is forward biased.

35. An apparatus, as set forth in claim 25, wherein said fourth means includes means for setting said preselected magnitude to zero in the absence of said enable signal.

36. An apparatus, as set forth in claim 25, wherein said fifth means includes a first resistor and capacitor, wherein the resistor is adapted to receive said difference signal and is connected to electrical ground through a capacitor, and means for altering one of the capacitance of said capacitor and the resistance of said resistor in response to receiving said enable signal.

37. An apparatus, as set forth in claim 36, wherein said altering means includes a second resistor and means for connecting said second resistor in series with said first resistor.

38. An apparatus, as set forth in claim 37, wherein said means for connecting said second resistor in series with said first resistor includes a transistor configured to operate as an emitter follower and a base-emitter diode in response to the presence and absence of said enable signal respectively, whereby the transistor substantially bypasses said second resistor.

39. A method for controlling the enable response time of an optical transmitter during the reception of a data signal, wherein said optical transmitter receives current from a pulse and a bias current supply, the method comprising the steps of:

delivering an enable signal, having a time duration correlative to said data signal;

delivering a first signal having a magnitude proportional to the optical intensity of said optical transmitter optical output;

storing the magnitude of said first signal, wherein the magnitude of said stored first signal varies at a first preselected rate for a first preselected duration of time in response to receiving said enable signal and at a second preselected rate thereafter; and comparing the magnitude of said stored signal to a preselected magnitude and altering the magnitude of said bias current in response to said first signal differing from said preselected magnitude.

40. A method for controlling the enable response time of an optical transmitter during the reception of a data signal, wherein said optical transmitter receives current from a pulse and bias current supply, the method comprising the steps of:

delivering an enable signal having a time duration correlative to said data signal;

delivering a first signal having a magnitude proportional to the optical intensity of said optical transmitter optical output;

storing the magnitude of said first signal;

comparing the magnitude of said stored signal to a preselected magnitude and delivering a signal having a magnitude corresponding to the difference therebetween; and integrating said difference signal and altering the magnitude of said bias current in response to the magnitude of said integrated difference signal, the rate of change of said integrated signal being a first preselected rate for a first preselected duration of time in response to receiving said enable signal and a second preselected rate thereafter.

41. A method for controlling the enable response time of an optical transmitter during the reception of a data signal, wherein said optical transmitter receives current from a pulse and a bias current supply, the method comprising the steps of:

delivering an enable signal having a time duration correlative to said data signal;

delivering a first signal having a magnitude proportional to the optical intensity of said optical transmitter optical output;

storing the magnitude of said first signal, wherein the magnitude of said stored first signal varies at first preselected rate for a first preselected duration of time in response to receiving said enable signal and at a second preselected rate thereafter;

comparing the magnitude of said stored signal to a preselected magnitude and delivering a signal having a magnitude corresponding to the difference therebetween; and integrating said difference signal and altering the magnitude of said bias current in response to the magnitude of said integrated difference signal, the rate of change of said integrated signal being a third preselected rate for a first preselected duration of time in response to receiving said enable signal and a fourth preselected rate thereafter.

* * * * *

UNITED STATES PATENT AND TRADEMARK OFFICE
CERTIFICATE OF CORRECTION

PATENT NO. : 5,065,456

DATED : Nov. 12, 1991

INVENTOR(S) : Takao Nakayama

It is certified that error appears in the above-identified patent and that said Letters Patent is hereby corrected as shown below:

Column 6, line 20, delete "2" and insert --26--. therefor

Column 7, line 44, delete "(through)" and insert --(trough)--therefor.

Signed and Sealed this

Ninth Day of March, 1993

Attest:

STEPHEN G. KUNIN

Attesting Officer

Acting Commissioner of Patents and Trademarks